United States Patent [19]
Kono

[11] Patent Number: 6,165,379
[45] Date of Patent: Dec. 26, 2000

[54] FERRITE SINTERED COMPACT AND ELECTRONIC PART COMPRISING THE SAME

[75] Inventor: Daiji Kono, Omihachiman, Japan

[73] Assignee: Murata Manufacturing Co., Ltd., Japan

[21] Appl. No.: 09/361,760

[22] Filed: Jul. 27, 1999

[30] Foreign Application Priority Data

Aug. 21, 1998 [JP] Japan .................................. 10-235260

[51] Int. Cl.⁷ ........................... C04B 35/30; C04B 35/28; C04B 35/26; H01R 1/37
[52] U.S. Cl. ................. 252/62.59; 252/62.6; 252/62.62; 501/35
[58] Field of Search ........................... 501/32; 252/62.59, 252/62.62, 62.6

[56] References Cited

U.S. PATENT DOCUMENTS

| | | | |
|---|---|---|---|
| 4,540,500 | 9/1985 | Torii et al. | 252/62.6 |
| 4,956,114 | 9/1990 | Watanabe et al. | 501/32 |
| 5,855,810 | 1/1999 | Kim | 501/32 |
| 6,094,111 | 7/2000 | Sunahara | 501/32 |

FOREIGN PATENT DOCUMENTS

| | | |
|---|---|---|
| 1110708 | 4/1989 | Japan . |
| 2288307 | 11/1990 | Japan . |

*Primary Examiner*—C. Melissa Koslow
*Attorney, Agent, or Firm*—Ostrolenk, Faber, Gerb & Soffen, LLP

[57] ABSTRACT

A ferrite sintered compact, as an element of an electronic part for forming an internal conductor containing silver, includes a ferrite containing at least two components selected from the group consisting of nickel, zinc and copper, and a glass having a viscosity at 650 to 850° C. of about $10^{10}$ Pa·s or more.

20 Claims, 1 Drawing Sheet

FERRITE SINTERED COMPACT AND ELECTRONIC PART COMPRISING THE SAME

BACKGROUND OF THE INVENTION

1. Field of the Invention

The present invention relates to ferrite sintered compacts, and particularly relates to a ferrite sintered compact which is preferably used as an element of an electronic part having an internal conductor containing silver. The present invention also relates to an electronic part comprising the ferrite sintered compact.

2. Description of the Related Art

Elements of electronic parts, such as inductor parts, are generally composed of ferrite sintered compacts. Some elements contain internal conductors therein. In this case, a calcination for obtaining ferrite sintered compacts is performed in a state in which internal conductors are formed therein. Silver and silver-palladium alloys are frequently used as conductor components contained in the internal conductors.

In order to produce a ferrite sintered compact satisfying required electrical characteristics, the ferrite must be fired at a relatively high temperature in the sintering step. When an internal conductor containing silver is formed, the silver contained in the internal conductor will be diffused into the ferrite portion during such high-temperature firing. Thus, the resulting electronic part may have deteriorated electrical characteristics.

A possible countermeasure of the above problem is addition of glass to the ferrite. Glass functions as a sintering promoter and decreases the sintering temperature of the ferrite. Thus, a decrease in sintering temperature by addition of glass enables calcination of the ferrite at a relatively low temperature, and thus suppresses diffusion of silver into the ferrite portion.

For example, Japanese Patent Application Laid-Open Nos. 1-110708 and 2-288307 disclose improved sintering characteristics of ferrite and improved mechanical strength and electrical characteristics, by addition of borosilicate glass to the ferrite.

Although the added borosilicate glass surely functions as a sintering promoter and decreases the sintering temperature of the ferrite, it has been found that borosilicate glass accelerates the diffusion of silver. Since boron accelerates diffusion of silver, the borosilicate glass, which is added in an amount of 1 percent by volume or more, further accelerates such tendency.

On the other hand, a large amount of glass effectively contributes to low-temperature sintering of ferrite. Regarding electrical characteristics, ferrite containing several tens percent by volume of glass can effectively suppress distortion of current high-frequency signals. In addition, many preferable effects are expected when a relatively large amount of glass is added.

SUMMARY OF THE INVENTION

The present invention provides a ferrite sintered compact containing a glass which functions as a sintering auxiliary for imparting sintering characteristics satisfying electrical characteristics to ferrite and retards diffusion of silver contained in an internal conductor. The present invention also provides an electronic part comprising the ferrite sintered compact.

The ferrite sintered compact, as an element of an electronic part having an internal conductor containing silver, comprises: a ferrite containing at least two components selected from the group consisting of nickel, zinc and copper, and a glass having a viscosity at 650 to 850° C. of about $10^{10}$ Pa·s or more.

According to the invention, diffusion of silver contained in the internal conductor can be effectively suppressed while maintaining sintering characteristics. Thus, in an electrical part using the ferrite sintered compact as an element, the electrical characteristics of the ferrite can be satisfactorily developed, and the proper shape of the internal conductor can be ensured.

When the glass content in the present invention is about 1 to 90 percent by volume with respect to the total amount of the ferrite and the glass, the above-mentioned advantages are further ensured.

When the glass is crystallized glass in the present invention, the above-described viscosity characteristics are further enhanced.

When a crystallized glass having a melting temperature of crystal of about 900° C. or less is used, sintering characteristics are further enhanced.

When the glass does not contain boron, acceleration of diffusion of silver by boron does not occur. Thus, diffusion of silver will be further suppressed. When the glass does not contain boron, the above preferable viscosity characteristics are readily achieved.

For the purpose of illustrating the invention, there is shown in the drawing a form which are presently preferred, it being understood, however, that the invention is not limited to the precise arrangements and instrumentalities shown.

DETAILED DESCRIPTION OF PREFERRED EMBODIMENTS

Figure 1:
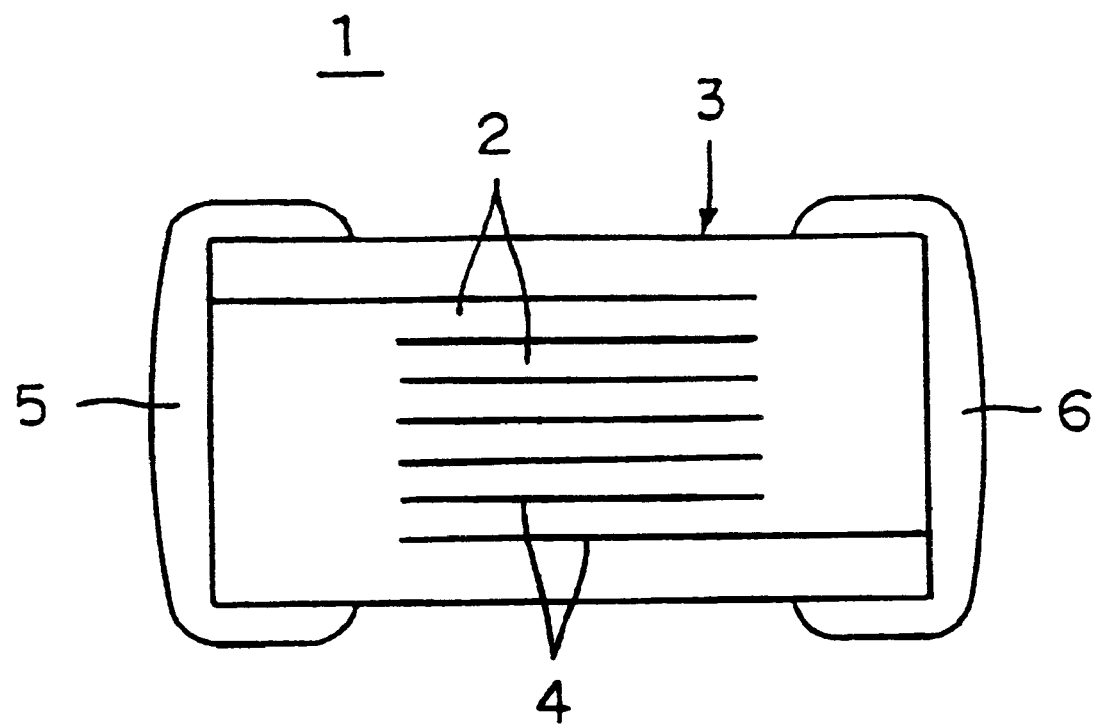
FIG. 1 is a cross sectional view showing an electronic part according to an embodiment of the present invention.

Hereinafter, the preferred embodiments of the present invention are explained in detail with reference to the drawing.

When an electronic part provided with an internal conductor containing silver is produced using the ferrite in accordance with the present invention as an element, the element generally has a monolithic configuration. Thus, the element having the monolithic configuration can be produced by lamination of a plurality of sheets or by repeating printing operations. An alternative method is a press molding process in which a conductive coil is placed into a mold and a powdered ferrite raw material is fed therein followed by pressing.

The raw material for forming a ferrite sintered compact by sintering contains a ferrite composition and glass. The ferrite composition is previously prepared so as to have a designed composition ratio and then sintered. The glass is added to the ferrite composition and then recompounded to prepare a raw material for the ferrite sintered compact.

The raw material is used as a slurry when it is applied to the above-described sheet lamination process, as a paste when it is applied to the printing process or as a molding powder when it is applied to a compression molding process.

The ferrite components contained in the raw material are composed of at least two components selected from the group consisting of nickel, zinc and copper, and the selected glass component has a viscosity at 650 to 800° C. of about $10^{10}$ pa·s or more.

In such a raw material or a ferrite sintered compact obtained by firing the raw material, the glass is preferably contained in an amount of about 1 to 90 percent by volume with respect to the total amount of the ferrite and the glass. Preferably, the glass is a crystallized glass, which has a melting temperature of about 900° C. or less and does not contain boron.

These technical grounds specifying this invention and the preferable embodiments are determined based on the following experiments.

Experiment 1

A Ni—Cu—Zn-based powder material ($\mu$=700) having a composition of 48.5 mole percent $Fe_2O_3$, 29.5 mole percent ZnO, 14.0 mole percent NiO and 8.0 mole percent CuO was prepared as a ferrite material.

As glasses which are added to the above Ni—Cu—Zn ferrite material, Glasses A to J having the compositions (unit: mole percent) shown in Table 1 were prepared.

TABLE 1

|  | $SiO_2$ | $B_2O_3$ | PbO | ZnO | $Al_2O_3$ | BaO | $Li_2O$ | $TiO_2$ | $Bi_2O_3$ | CaO |
|---|---|---|---|---|---|---|---|---|---|---|
| Glass A | 50 | 0 | 0 | 15 | 5 | 15 | 10 | 0 | 0 | 5 |
| Glass B | 50 | 0 | 0 | 0 | 5 | 20 | 15 | 5 | 0 | 5 |
| Glass C | 50 | 10 | 0 | 0 | 5 | 15 | 10 | 5 | 0 | 5 |
| Glass D | 50 | 0 | 0 | 0 | 5 | 5 | 10 | 5 | 20 | 5 |
| Glass E | 15 | 0 | 0 | 0 | 0 | 35 | 5 | 5 | 35 | 5 |
| Glass F | 40 | 0 | 0 | 0 | 0 | 40 | 0 | 20 | 0 | 0 |
| Glass G | 75 | 20 | 0 | 0 | 0 | 0 | 5 | 0 | 0 | 0 |
| Glass H | 30 | 20 | 0 | 45 | 0 | 0 | 0 | 0 | 0 | 5 |
| Glass I | 35 | 5 | 50 | 0 | 5 | 0 | 0 | 5 | 0 | 0 |
| Glass J | 10 | 35 | 0 | 40 | 0 | 5 | 5 | 0 | 0 | 5 |

Next, the viscosity of each of Glasses A to J shown in Table 1 was measured at temperatures of 600° C., 650° C., 700° C., 750° C., 800° C., and 850° C., and the crystallization thereof was evaluated. The viscosity was measured by a rotational high-viscometer using a melted sample of each of Glasses A to J or by a parallel-plate compressing viscometer using a columnar sample having a diameter of 7 mm and a height of 6 mm which was prepared by melting each of Glasses A to J.

The crystallization was confirmed by X-ray diffractometry of Glasses A to J.

The results of the viscosity and crystallization are shown in Table 2. In Table 2, the viscosity $\eta$ (Pa·s) at each temperature is represented by $\log_{10}\eta$.

TABLE 2

|  | $\log_{10}\eta$ | | | | | | |
|---|---|---|---|---|---|---|---|
| ° C. | 600 | 650 | 700 | 750 | 800 | 850 | Crystallization |
| Glass A | ≧13 | ≧13 | ≧13 | ≧13 | ≧13 | ≧13 | Observed |
| Glass B | ≧13 | ≧13 | ≧13 | ≧13 | ≧13 | ≧13 | Observed |
| Glass C | 6 | ≧13 | ≧13 | ≧13 | ≧13 | 3 | Observed |
| Glass D | 6 | ≧13 | ≧13 | ≧13 | ≧13 | 3 | Observed |
| Glass E | ≧13 | ≧13 | ≧13 | ≧13 | 10 | 2 | Observed |
| Glass F | ≧13 | ≧13 | 13 | 11 | 10 | 8 | Observed |
| Glass G | 12 | 11 | 10 | 8 | 7 | 6 | Not observed |
| Glass H | 10 | 7 | 6 | 5 | 3 | 2 | Observed |
| Glass I | 7 | 6 | 5 | 3 | 2 | 1 | Not observed |
| Glass J | 7 | 5 | 4 | 3 | 2 | 1 | Not observed |

In Table 2, Glasses A to F are within the scope of the present invention.

Binder, plasticizer and solvent were added to the above-described Ni—Cu—Zn-based ferrite material, and one of Glasses A to J shown in Table 2 was added thereto in an amount of 20 percent by volume with respect to the total amount of the ferrite material and the glass. These were kneaded to prepare a slurry.

A green sheet having a thickness of 100 $\mu$m or less was prepared from each slurry by a doctor blade method.

Each green sheet was cut to an oblong shape having a length of 60 mm and a width of 40 mm, and a silver paste was applied on the cut green sheet by a screen printing process to form an internal conductor having a width of 300 $\mu$m and a thickness of 20 $\mu$m. Next, a green laminated sheet prepared by laminating a unprinted sheet on the printed sheet was pressed, and was cut to pieces containing the internal conductor. The pieces were fired at 870° C., 900° C., 930° C. or 960° C. for 2 hours.

The state of the internal conductor lying at the cross-section of each fired sample was observed using a scanning electron microscope and an optical microscope. The results of the observation are shown in Table 3.

TABLE 3

| Type of | Firing Temperature (° C.) | | | |
|---|---|---|---|---|
| Added Glass | 870 | 900 | 930 | 960 |
| Glass A | A | A | A | A |
| Glass B | A | A | A | A |
| Glass C | A | A | A | B |
| Glass D | A | A | A | B |
| Glass E | A | A | A | A |
| Glass F | A | A | A | A |
| Glass G | B | B | B | B |
| Glass H | B | B | B | B |
| Glass I | B | B | B | B |
| Glass J | B | B | B | B |

In Table 3, symbol "A" represents when the internal conductor is continuously present, and symbol "B" represents when it is discontinuously present, disappeared, partly diffused or is present at an unintended position.

Table 3 demonstrates that the state of the internal conductor of the sample containing each of Glasses A to F is continuous without defects such as thinning at firing temperatures of 870° C. to 930° C. and is ranked as "A". In contrast, the samples containing each of Glasses G to J outside the scope of the present invention is ranked as "B", since silver contained in the internal conductor disappears at firing temperatures of 870° C. or more.

The results of the observed internal conductor shown in Table 3 are highly relevant to the viscosity of the glass shown in Table 2. Each of Glasses A to F added to the samples ranked as "A" at firing temperatures of 870 to 930°

C. shown in Table 3 has a viscosity of $10^{10}$ or more Pa·s or more at a measuring temperature of 650 to 800° C., as shown in Table 2. On the other hand, most of Glasses G to J added to the samples ranked as "B" at firing temperatures of 870 to 930° C. shown in Table 3 have a viscosity of less than $10^{10}$ Pa·s at a measuring temperature of 650 to 800° C., as shown in Table 2.

As shown by the comparison of the results of the observed internal conductor shown in Table 3 with the composition of the glass shown in Table 1, no glass composition significantly affects the results of the internal conductor. This also suggest that the viscosity of the added glass is a primary factor determining diffusion of silver.

As shown in Table 2, all Glasses A to F which provide ferrite sintered compacts within the scope of the present invention are crystallized glasses. The results suggest that the crystallized glass has a viscosity of $10^{10}$ pa·s or more.

It is known that diffusion of silver contained in the internal conductor is accelerated when the glass contains boron. Thus it is preferable that the glass do not contain boron. Most of Glasses A to F other than Glass C, that is Glasses A, B, and D to F having a viscosity within the scope of the present invention, as shown in Table 2, do not contain boron. The results suggest that glass not containing boron readily has a viscosity within the scope of the present invention.

The sintering characteristics of the ferrite sintered compact according to each sample were evaluated. The above-mentioned green sheets were laminated and pressed. The laminated sheet was punched to form ring samples having an inner diameter of 8 mm, an outer diameter of 16 mm and a thickness of 2 mm. The ring samples were fired at a temperature of 870° C., 900° C., 930° C. or 960° C. Each of the resulting ring ferrite sintered compacts was immersed in boiling water for 2 hours. The water absorption percentage was determined by the change in weight during the step as a measure of the sintering characteristics.

Table 4 shows the water absorption percentage of each of the samples containing Glasses A to J. Table 4 also shows the melting temperature of the crystal showing a change from crystallized to amorphous of the glasses, that is, Glasses A to F and H.

TABLE 4

| Type of Added Glass | Firing Temperature (° C.) | | | | Melting Temperature (° C.) of Crystal |
|---|---|---|---|---|---|
| | 870 | 900 | 930 | 960 | |
| Glass A | 12.00 | 8.03 | 2.72 | 0.07 | 930 |
| Glass B | 8.09 | 6.54 | 0 | 0 | 900 |
| Glass C | 0.02 | 0 | 0 | 0 | 850 |
| Glass D | 4.27 | 0 | 0 | 0 | 850 |
| Glass E | 0 | 0 | 0 | 0 | 800 |
| Glass F | 23.32 | 21.23 | 19.81 | 18.56 | 1,250 |
| Glass G | 7.05 | 5.63 | 2.35 | 0.12 | — |
| Glass H | 17.58 | 15.62 | 7.74 | 2.37 | 1,050 |
| Glass I | 0 | 0 | 0 | 0 | — |
| Glass J | 0 | 0 | 0 | 0 | — |

With reference to Table 4, the water absorption percentage is compared between samples containing Glasses A to F within the scope of the present invention. The water absorption percentage is 0 percent for the samples containing Glasses B to E and fired at a temperature of 930° C. to 960° C. Thus, these samples have satisfactory results regarding the water absorption percentage and sintering characteristics compared with the samples containing Glasses A and F.

As shown in the melting temperature, the above results are caused by the viscosity of the glass which decreases at the firing temperature in the sample containing each of Glasses B to E. That is, the melting temperature of the glass is preferably about 900° C. or less.

In the samples containing each of Glasses C to E having a melting temperature of the glass of 850 ° C. or less, the resulting ferrite sintered compacts have a water absorption percentage of 0 percent after firing at 900° C. The results demonstrate the preferable melting temperature of crystal of the glass.

Experiment 2

For Glasses B to E used in Experiment 1, slurries having glass contents of 1 percent by volume, 3 percent by volume, 5 percent by volume, 10 percent by volume, 20 percent by volume, 50 percent by volume, 90 percent by volume and 95 percent by volume of glass with respect to the total amount of the ferrite and the glass were prepared as in Experiment 1. Using each slurry, a green laminated sheet provided with an internal conductor was produced as in Experiment 1, and fired at 900° C. to form a ferrite sintered compact as a sample.

The internal conductor at the cross-section of the ferrite sintered compact was evaluated as in Experiment 1. The results are shown in Table 5.

TABLE 5

| Amount of Added Glass (percent by volume) | Type of Glass | | | |
|---|---|---|---|---|
| | B | C | D | E |
| 1 | A | A | A | A |
| 3 | A | A | A | A |
| 5 | A | A | A | A |
| 10 | A | A | A | A |
| 20 | A | A | A | A |
| 50 | A | A | A | A |
| 90 | A | A | A | A |
| 95 | A | A | A | A |

Table 5 demonstrates that Glasses B to E in an amount in a range of about 1 to 95 percent by volume enhance the sintering characteristics of the ferrite and suppress diffusion of silver as a result.

Although not shown in Table 5, a glass content of less than 1 percent by volume does not cause the sintering auxiliary effect. On the other hand, a glass content of more than 90 percent by volume deteriorates the properties of ferrite. Accordingly, it is preferable that the glass content be about 1 to 90 percent by volume.

Experiment 3

FIG. 1 is a cross sectional view of a laminated chip inductor 1 as an example of an electronic part according to an embodiment of the present invention. The laminated chip inductor 1 comprises a inductor body 3. The inductor body 3 is made of the ferrite sintered compact according to the present invention as explained in Experiments 1 and 2 in detail. The inductor body 3 has the structure in which a plurality of ferrite layers 2 are laminated and an internal conductor 4 comprising a silver are embedded between the ferrite layers 2. The internal conductor 4 includes the portions extending along the boundaries between the ferrite layers 2 as shown in FIG. 1 and portions passing through the ferrite layers 2 (not shown in FIG. 1), thereby forming a spiral coil. The inductor body 1 is formed by stacking green sheets which are to be ferrite layers 2 while printing a conductive past which comprises silver to form a pattern of the internal conductor on the green sheets, and by firing the green sheets and the conductive paste.

External electrodes 5 and 6 are formed on the opposite end surfaces, respectively, so as to be electrically connected with the internal conductor 4. The external electrodes 5 and 6 are formed by, for example, applying a conductive paste on the end surfaces and sintering the conductive paste.

Although the laminated chip inductor 1 is explained as an example of electronic part according to a preferred embodiment of the present invention, it is understood that the electronic part according to a preferred embodiment of the present invention can be one of various inductor elements. Also, the electronic part of the present invention can be applied to composite electronic part which has an inductance component.

As explained in above, the ferrite sintered compact according to the present invention is especially suitable for an element used in combination with internal conductor comprising silver. Since silver has an excellent low resistance and is an inexpensive material compared to palladium, it is possible to realize an inductor part which has an excellent characteristics and can be produced at a low cost.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A ferrite sintered compact comprising: a ferrite containing at least two members selected from the group consisting of nickel, zinc and copper, and a glass having a viscosity at 650 to 850° C. of at least about $10^{10}$ Pa·s.

2. A ferrite sintered compact according to claim 1, wherein the glass is about 1 to 90 percent by volume with respect to the total volume of the ferrite and the glass.

3. A ferrite sintered compact according to claim 2, wherein the glass is a crystallized glass.

4. A ferrite sintered compact according to claim 3, wherein the crystallized glass has a melting temperature of about 900° C. or less.

5. A ferrite sintered compact according to claim 4, wherein the crystallized glass does not contain boron.

6. A ferrite sintered compact according to claim 1, wherein the glass is a crystallized glass.

7. A ferrite sintered compact according to claim 6, wherein the crystallized glass has a melting temperature of about 900° C. or less.

8. A ferrite sintered compact according to claim 7, wherein the crystallized glass does not contain boron.

9. A ferrite sintered compact according to claim 1, wherein the glass has a melting temperature of about 900° C. or less.

10. A ferrite sintered compact according to claim 1, wherein the glass does not contain boron.

11. An electronic component comprising:

a ferrite sintered compact according to claim 10; and an internal conductor comprising silver in the ferrite sintered compact.

12. An electronic component comprising:

a ferrite sintered compact according to claim 9; and an internal conductor comprising silver in the ferrite sintered compact.

13. An electronic component comprising:

a ferrite sintered compact according to claim 8; and an internal conductor comprising silver in the ferrite sintered compact.

14. An electronic component comprising:

a ferrite sintered compact according to claim 7; and an internal conductor comprising silver in the ferrite sintered compact.

15. An electronic component comprising:

a ferrite sintered compact according to claim 6; and an internal conductor comprising silver in the ferrite sintered compact.

16. An electronic component comprising:

a ferrite sintered compact according to claim 5; and an internal conductor comprising silver in the ferrite sintered compact.

17. An electronic component comprising:

a ferrite sintered compact according to claim 4; and an internal conductor comprising silver in the ferrite sintered compact.

18. An electronic component comprising:

a ferrite sintered compact according to claim 3; and an internal conductor comprising silver in the ferrite sintered compact.

19. An electronic component comprising:

a ferrite sintered compact according to claim 2; and an internal conductor comprising silver in the ferrite sintered compact.

20. An electronic component comprising:

a ferrite sintered compact according to claim 1; and an internal conductor comprising silver in the ferrite sintered compact.

* * * * *